(12) United States Patent
Johnston

(10) Patent No.: US 10,494,914 B2
(45) Date of Patent: Dec. 3, 2019

(54) MEASUREMENT OF TEMPERATURE USING COMBINATION OF RAYLEIGH AND RAMAN BACKSCATTER INTERFEROMETRY

(71) Applicant: William Albert Johnston, Houston, TX (US)

(72) Inventor: William Albert Johnston, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 263 days.

(21) Appl. No.: 15/424,157

(22) Filed: Feb. 3, 2017

(65) Prior Publication Data

US 2018/0223647 A1   Aug. 9, 2018

(51) Int. Cl.
*G01K 13/00* (2006.01)
*E21B 47/06* (2012.01)
*G01K 11/32* (2006.01)
*E21B 47/10* (2012.01)

(52) U.S. Cl.
CPC .......... *E21B 47/065* (2013.01); *E21B 47/102* (2013.01); *G01K 11/32* (2013.01); *G01K 2011/324* (2013.01)

(58) Field of Classification Search
None
See application file for complete search history.

(56) References Cited

U.S. PATENT DOCUMENTS

| | | | |
|---|---|---|---|
| 8,077,314 B2 | 12/2011 | Davies et al. | |
| 2007/0199696 A1* | 8/2007 | Walford | E21B 43/2406 166/250.01 |
| 2013/0061688 A1 | 3/2013 | Hayward | |
| 2013/0266039 A1 | 10/2013 | Legrand et al. | |
| 2013/0333474 A1 | 12/2013 | Godfrey et al. | |
| 2015/0146759 A1 | 5/2015 | Johnston | |
| 2015/0300891 A1 | 10/2015 | Mitchell et al. | |

OTHER PUBLICATIONS

International Search Report; International Application No. PCT/US2017/066121; dated Apr. 3, 2018, 3 pages.
Written Opinion for the International Search Report; International Application No. PCT/US2017/066121; dated Apr. 3, 2018, 5 pages.

* cited by examiner

*Primary Examiner* — Lisa M Caputo
*Assistant Examiner* — Nasir U. Ahmed
(74) *Attorney, Agent, or Firm* — Cantor Colburn LLP

(57) ABSTRACT

A method of measuring temperatures, includes disposing a carrier in a borehole in an earth formation, the carrier having an optical fiber connected thereto, interrogating the optical fiber with a pulsed optical signal generated by a distributed temperature sensing (DTS) assembly, the pulsed optical signal having a first frequency, and receiving first reflected signals from the optical fiber, estimating an absolute temperature from the reflected signals, interrogating the optical fiber with an at least partially coherent optical signal from a phase sensitive optical time domain reflectometry (φ-OTDR) assembly, the at least partially coherent optical signal having a second frequency, and receiving second reflected signals from multiple scattering locations in the optical fiber; estimating a phase difference between the reflected signals, and estimating a temperature change based on the phase difference, and combining the absolute temperature and the temperature change to generate a temperature profile at a location in the borehole.

20 Claims, 4 Drawing Sheets

MEASUREMENT OF TEMPERATURE USING COMBINATION OF RAYLEIGH AND RAMAN BACKSCATTER INTERFEROMETRY

BACKGROUND

Fiber-optic sensors have been utilized in a number of applications, and have been shown to have particular utility in sensing parameters in harsh environments. Optical fibers have utility in various downhole applications including communication and measurements, e.g., to obtain various surface and downhole measurements, such as pressure, temperature, stress and strain.

Distributed Temperature Sensing (DTS) systems utilize fiber optic cables or other devices capable of measuring temperature values at multiple locations along the length of a wellbore. DTS can be used to measure, for example, a continuous temperature profile along the wellbore by measuring temperature over many minutes of integration time.

SUMMARY

An embodiment of a method of measuring temperatures includes disposing a carrier in a borehole in an earth formation, the carrier having an optical fiber connected thereto, interrogating the optical fiber with a pulsed optical signal generated by a distributed temperature sensing (DTS) assembly, the pulsed optical signal having a first frequency, receiving first reflected signals from the optical fiber, and estimating an absolute temperature from the reflected signals. The method also includes interrogating the optical fiber with an at least partially coherent optical signal from a phase sensitive optical time domain reflectometry (φ-OTDR) assembly, the at least partially coherent optical signal having a second frequency, and receiving second reflected signals from multiple scattering locations in the optical fiber. The method further includes estimating a phase difference between the reflected signals, estimating a temperature change based on the phase difference, and combining the absolute temperature and the temperature change to generate a temperature profile at a location in the borehole.

An embodiment of a system for measuring temperatures includes an optical fiber having a length connected to a carrier configured to be disposed in a borehole in an earth formation, a distributed temperature sensing (DTS) assembly configured to interrogate the optical fiber with a pulsed optical signal and receive first reflected signals from the optical fiber, the pulsed optical signal having a first frequency, and a phase sensitive optical time domain reflectometry (φ-OTDR) assembly configured to interrogate the optical fiber with an at least partially coherent optical signal and receive second reflected signals from multiple scattering locations in the optical fiber, the at least partially coherent optical signal having a second frequency. The system also includes a processor configured to perform: estimating an absolute temperature from the reflected signals, estimating a phase difference between the reflected signals, estimating a temperature change based on the phase difference, and combining the absolute temperature and the temperature change to generate a temperature profile at a location in the borehole.

BRIEF DESCRIPTION OF THE DRAWINGS

Referring now to the drawings, wherein like elements are numbered alike in the several Figures.

DETAILED DESCRIPTION

Apparatuses, systems and methods for parameter (e.g., temperature) measurement are provided. An embodiment of a parameter measurement system includes at least one optical fiber configured to be disposed in a borehole in an earth formation and one or more light sources (e.g., one or more lasers) configured to interrogate the optical fiber. The system is configured to interrogate the optical fiber with optical signals having a first wavelength and estimate absolute temperature values based on Raman backscatter, in combination with interrogating the optical fiber with optical signals having a different second wavelength and estimating temperature changes based on phase changes in reflected signals. In one embodiment, the optical signals having the second wavelength are at least partially coherent and are generated by a phase sensitive optical time domain reflectometry (φ-OTDR) assembly. The system, in one embodiment, is configured to measure absolute temperature on a first time scale and measure temperature changes on a smaller time scale to provide for high resolution temperature data at high (e.g., kHz) update rates.

Figure 1:
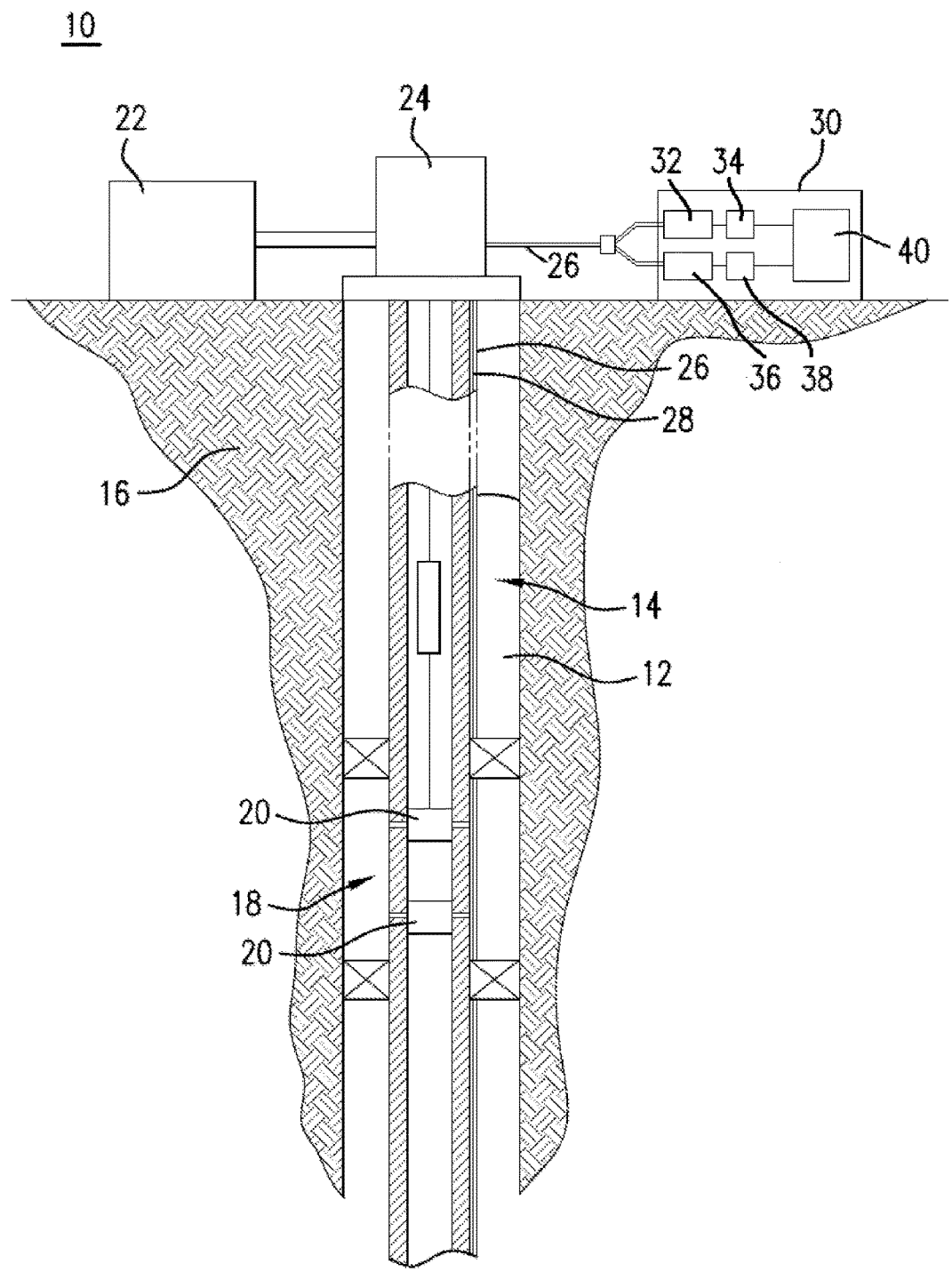
FIG. 1 is a cross-sectional view of an embodiment of a downhole drilling, monitoring, evaluation, exploration and/or production system.

Referring to FIG. 1, an exemplary embodiment of a downhole drilling, monitoring, evaluation, stimulation and/or production system 10 associated with a borehole 12 is shown. The system 10 may be used in conjunction with any of a variety of different energy industry operations, such as a drilling operation, a measurement operation, a stimulation operation (e.g., hydraulic fracturing) and/or a production operation. A borehole string 14 is disposed in the borehole 12, which penetrates at least one earth formation 16 for facilitating operations such as drilling, production and making measurements of properties of the formation 16 and/or the borehole 12. The borehole string 14 includes any of various components to facilitate subterranean operations. The borehole string 14 is made from, for example, a pipe, multiple pipe sections or flexible tubing. The borehole string 14 includes for example, a drilling system and/or a bottom-hole assembly (BHA).

The system 10 and/or the borehole string 14 include any number of downhole tools 18 for various processes including drilling, hydrocarbon production, and formation evaluation (FE) for measuring one or more physical quantities in or around a borehole. Various measurement tools may be incorporated into the system 10 to affect measurement regimes such as wireline measurement applications or logging-while-drilling (LWD) applications.

In one embodiment, the borehole string 14 is configured as a production string and includes a tool 18 configured as a stimulation assembly as part of, for example, a bottomhole assembly (BHA). The stimulation assembly is configured to inject stimulation fluids such as hydraulic fracturing fluids and/or acid stimulation fluids into the formation. Stimulation fluids may include any suitable fluid used to reduce or eliminate an impediment to fluid production.

For example, the system 10 includes one or more injection assemblies 20 configured to control injection of stimulation fluid and direct stimulation fluid into one or more production zones in the formation. Each injection assembly 20 includes, e.g., one or more injection or flow control devices configured to direct stimulation fluid from a conduit in the string 14 to the borehole 12. A fluid source 22 may be coupled to a wellhead 24 and injected into the borehole string 14.

The system 10 also includes a measurement system configured to collect measurement data related to parameters such as downhole temperatures. The measurement system includes at least one optical fiber sensor 26 configured to be interrogated to measure downhole properties such as temperature. The optical fiber sensor 26 includes at least one optical fiber having a plurality of sensing locations disposed along the length of the optical fiber. Examples of sensing locations include fiber Bragg gratings (FBG), mirrors, Fabry-Perot cavities and locations of intrinsic scattering. Locations of intrinsic scattering include points in or lengths of the fiber that reflect interrogation signals, such as Raman scattering, Brillouin scattering and/or Rayleigh scattering locations. The optical fiber sensor 26 may also be configured to estimate other parameters such as pressure, stress, strain, vibration and deformation of downhole components such as the borehole string 14 and the tools 18. A cable 28 may also be included and include components for measurement and/or communication, such as electrical conductors and optical fibers for communication and/or measurement (e.g., for measurement of other parameters or as a reference optical fiber). Although the optical fiber sensor 26 and/or cable 28 are depicted on the production tubing, they are not so limited and may be anywhere within the borehole, be cemented into the casing, or deployed temporarily through coiled tubing or wireline.

The measurement system also includes an interrogation unit 30 configured to transmit an electromagnetic interrogation signal into the optical fiber sensors and receive reflected signals from one or more locations in each optical fiber sensor. An example of an interrogation unit is a reflectometer unit that includes, for example, an OFDR and/or OTDR type interrogator. Interrogation signals are also referred to herein as optical signals, and may have wavelengths or wavelength ranges having any suitable value. For example, optical signals may include visible light signals and/or other light signals (e.g., ultraviolet). The interrogation unit 30 includes components such as a first optical signal source 32 (e.g., a pulsed light source, LED, laser, etc.) and a first detector 34 (e.g., a photodetector such as a photodiode) coupled to the optical fiber sensor 26. The components also include a second optical signal source 36 (e.g., a pulsed light source, LED, laser, etc.) and a second detector 38 coupled to the optical fiber sensor 26. In one embodiment, a processor 40 is in operable communication with the signal sources and/or detectors, and is configured to control the sources and receive reflected signal data from the detectors. Although the first optical signal source 32 and the second optical signal source 36 are shown as coupled to a single optical fiber, they are not so limited. For example, the first optical signal source 32 and the second optical signal source 36 may be coupled to separate fibers.

In one embodiment, the measurement system is configured as a temperature measurement system that includes components for acquiring reflectometry data from Raman backscatter signals from a distributed temperature sensing (DTS) assembly and from Rayleigh backscatter signals from a coherent or phase resolving optical time domain reflectometry (OTDR) assembly (also referred to as a φ-OTDR assembly). For example, the first optical signal source 32 and the detector 34 are part of a DTS assembly for interrogating the optical fiber sensor 26, and the second optical signal source 36 and the detector 38 are part of a φ-OTDR assembly for interrogating the optical fiber sensor 26.

The DTS assembly utilizes Spontaneous Raman Scattering (SRS) in optically transparent material in an optical fiber sensor to measure temperature. Raman backscatter is caused by molecular vibration in the optical fiber as a result of incident light, which causes emission of photons that are shifted in wavelength relative to the incident light. Positively shifted photons, referred to as Stokes backscatter, are independent of temperature. Negatively shifted photons, referred to as Anti-Stokes backscatter, are dependent on temperature. An intensity ratio of Stokes to Anti-Stokes back-scatter may be used to calculate temperature. As discussed further below, in one embodiment, the DTS assembly is configured to measure anti-Stokes backscatter and estimate absolute temperature values therefrom.

The φ-OTDR assembly employs coherent or phase optical time domain reflectometry (OTDR), such as that used in a distributed acoustic sensor (DAS). In φ-OTDR-based sensors, the optical signal launched into an optical fiber is at least partially coherent, e.g., the coherence length of pulsed signals emitted is longer than the pulse length. Pulses of light from an electromagnetic source (e.g., laser) are launched into an optical fiber, which naturally undergoes Rayleigh scattering as they propagate down the fiber and light scattering from different sections of the fiber can interfere with each other. By looking at phase changes in backscattered signals, changes in the optical path length within the fiber can be estimated and correlated with temperature changes.

The φ-OTDR assembly operates by firing a relatively narrow linewidth laser (e.g., having a narrower linewidth than the DTS assembly) into a fiber and then measuring the coherent Rayleigh backscatter produced. This coherent Rayleigh scatter is an interferometric signal produced by back-scatter sites that are frozen into the fiber during its production. This coherent Rayleigh backscatter essentially turns each section of the fiber into a several meter long interferometer which is sensitive to tiny strain perturbations (nano-strains are typically measured) and also tiny thermal effects due to the thermo-optic coefficient (change in index of refraction per C) and the coefficient of thermal expansion of the optical fiber constituent material (e.g., fused silica).

Temperature changes estimated using φ-OTDR signal data may be used in conjunction with absolute temperature measurement data taken from the DTS assembly and/or from one or more other temperature measurement devices or systems. Although embodiments discussed herein use DTS for measuring absolute temperature, they are not so limited, as any suitable measurement assembly or system (e.g., arrays of discrete temperature sensors) can be used to estimate absolute temperature.

In one embodiment, the DTS assembly and the φ-OTDR assembly are operated to provide a calibrated distributed temperature measurement or profile at that accounts for temperature changes at a selected precision (e.g., on the order of 0.01 degrees C.) and at a high temporal resolution. For example, the temperature profile may present temperature data for successive time windows having a length on the order of milliseconds (i.e., at update rates on the order of kHz).

The precision and time scale selected for temperature measurements may be any suitable time scale, which may depend on factors such as pulse width and depth along the optical fiber. In one embodiment, the DTS assembly is configured to estimate the absolute temperature using a time scale that is greater than the time scale used for the ϕ-OTDR. In other words, estimating the absolute temperature is performed for each of a first plurality of successive time windows or intervals, and estimating the temperature change is performed for each of a second plurality of successive time windows, each of the first plurality of successive time windows being less than or otherwise being different than each of the second plurality of successive time windows. The first plurality of successive time windows can be simultaneous (e.g., occurring over the same time period) or at different times. For example, the signals for temperature change and the signals for absolute temperature can be measured simultaneously, which allows the absolute temperature measurement from the DTS assembly to be acquired at nearly 100% duty cycle and the temperature change measurement acquired at least substantially continuously.

For example, the DTS assembly acquires one or more absolute temperature measurements for successive time intervals. A single absolute temperature measurement may be acquired during each time interval, or multiple measurements may be acquired during the time interval and statistically analyzed (e.g., averaged) to obtain an absolute temperature value. The ϕ-OTDR assembly can acquire temperature change data for smaller time intervals to generate temperature changes at a high resolution and accordingly generate a high resolution temperature profile having, e.g., a kHz update rate.

For example, the optical fiber is interrogated alternately with signal from the DTS and phi-OTDR to acquire absolute temperature measurements at selected time intervals (e.g., every one second to one minute) using DTS and acquire thermal changes in the fiber in real time. By using the DTS assembly to measure the absolute temperature and the ϕ-OTDR to measure the thermal changes, an ultra-high resolution real-time temperature measurement can be accomplished.

Figure 2:
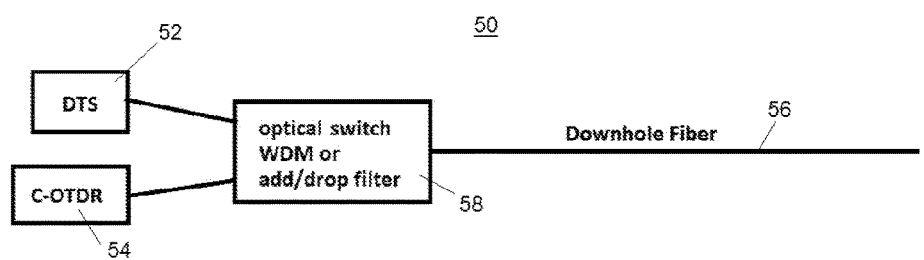
FIG. 2 depicts an embodiment of a measurement system including a distributed temperature sensing (DTS) assembly and a phase resolving optical time domain reflectometry (OTDR) assembly.
Figure 3:
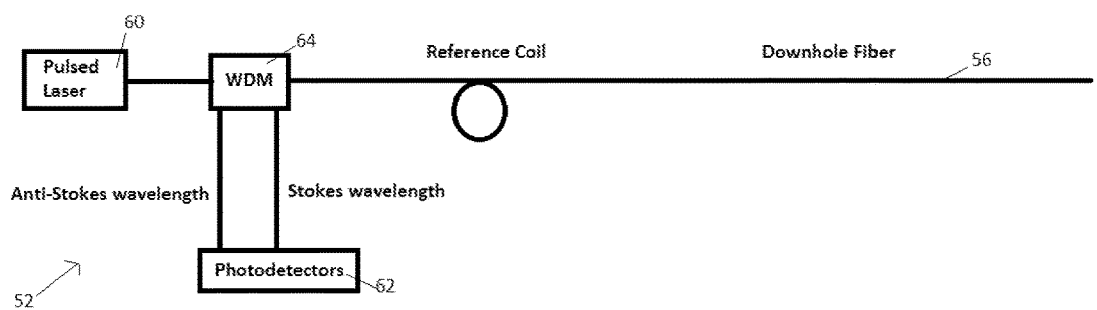
FIG. 3 depicts an embodiment of a measurement system including a DTS assembly and a phase resolving OTDR assembly.
Figure 4:
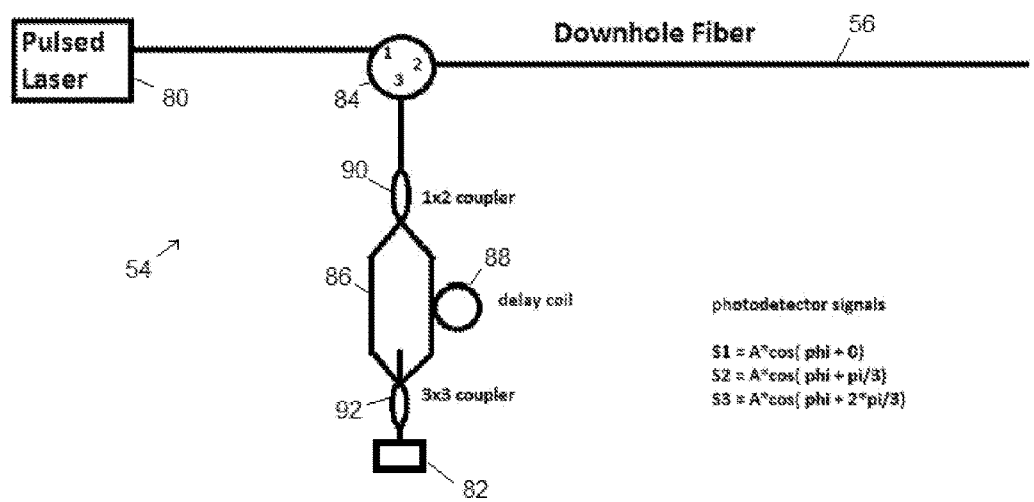
FIG. 4 depicts an embodiment of a measurement system including a DTS assembly and a phase resolving OTDR assembly.

FIGS. 2-4 illustrate embodiments of a measurement system 50 including a DTS assembly 52 and a ϕ-OTDR assembly 54 coupled to an optical fiber 56. The assemblies may be separate units or incorporated as a single unit (e.g., in a single chassis). The assemblies are coupled to the optical fiber 56 by a switching mechanism 58, such as an optical switch, wavelength division multiplexer (WDM) or add/drop filter.

Referring to FIG. 3, the DTS assembly 52 includes a DTS laser 60 configured to launch pulsed optical signals into the optical fiber 56 at a selected frequency (e.g., 1550 nm) and detect the backscattered spontaneous Raman signal at photodetectors 62 coupled to suitable processing components (e.g., a DAQ). In this embodiment, interrogation signals are launched into the optical fiber 56 via a wavelength division multiplexer (WDM) 64 and backscattered Stokes and/or anti-Stokes are detected by the photodetector 62. The DTS assembly may include additional components, such as a reference coil in order to provide a temperature calibration point to the system.

Referring to FIG. 4, the ϕ-OTDR assembly 54 includes a laser 80 configured to launch at least partially coherent signals into the optical fiber 56 at a selected frequency (e.g., 1570 nm) and detecting the backscattered Rayleigh signals at photodetectors 82 coupled to suitable processing components (e.g., a DAQ). In this embodiment, interrogation signals are launched into the optical fiber 56 via an optical circulator 84 and backscattered signals are detected by the photodetector 62. A Mach-Zehnder interferometer is formed by a primary fiber length 86 and a reference fiber length 88 including a delay coil (or any suitable reference path). Backscattered light is split via a 1×2 coupler 90 and recombined at a 3×3 coupler 92.

Although the DTS and phi-OTDR assemblies are shown as coupled to a single optical fiber, they are not so limited. For example, the assemblies can be coupled to respective individual fibers, which may be co-located (e.g., in the same cable).

Figure 5:
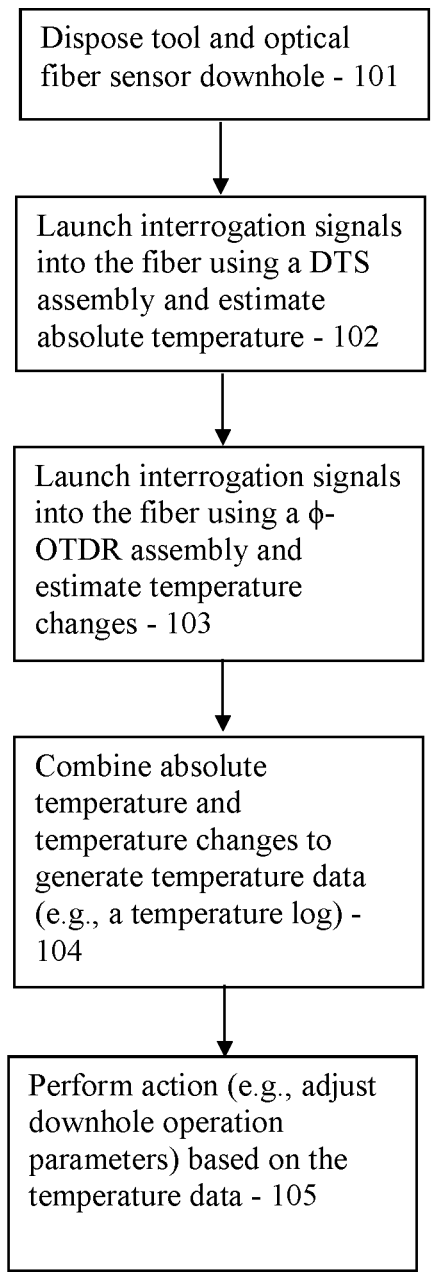
FIG. 5 is a flow chart illustrating a method of measuring temperature in a downhole environment and/or controlling aspects of an energy industry operation.

FIG. 5 illustrates a method 100 of measuring temperature in a downhole environment and/or controlling aspects of an energy industry operation. The method 100 includes one or more of stages 101-105 described herein. The method 100 may be performed continuously or intermittently as desired, and may be performed in real time during a monitored operation. The method 100 may be performed by one or more processors or other devices capable of receiving and processing measurement data, such as the interrogation unit 30 or any processor configured to receive and process measurement data. In one embodiment, the method includes the execution of all of stages 101-105 in the order described. However, certain stages 101-105 may be omitted, stages may be added, or the order of the stages changed.

In the first stage 101, a component such as the tool 18 is lowered into or otherwise disposed in the borehole 12. An optical fiber is disposed with the tool 18 and extends along a length of the borehole string 14. An energy industry operation is performed, such as a drilling, stimulation (e.g., hydraulic fracturing or acid stimulation) and/or production operation.

In the second stage 102, an absolute temperature measurement is performed by interrogating the optical fiber with an optical signal configured to result in Raman backscattering, e.g., by a DTS assembly such as the DTS assembly 52. In one embodiment, the optical signal is a series of pulses emitted by a broad linewidth laser. For example, a pulsed signal at a Stokes wavelength (e.g., 1550 nm or 1650 nm) and/or a pulsed signal at an anti-Stokes wavelength (e.g., 1460 nm or 1330 nm) are launched into the optical fiber, and return signals due to backscatter are detected.

An absolute temperature value is calculated for successive time windows based on return signals generated by Raman backscatter. In one embodiment, only an anti-Stokes backscatter signal is measured and two Rayleigh backscatter traces, the Stokes wavelengths are discounted, and the anti-Stokes return signal is used to calculate absolute temperature. An example of such a calculation is described in U.S. Patent Application Publication No. 2015/0300891 to Mitchell et al., published on Oct. 22, 2015, the entire contents of which are incorporated by reference herein. Alternatively, a ratio of the intensity of the Stokes return signal and the anti-Stokes return signal is calculated to estimate the absolute temperature.

The signal intensity from Raman backscatter may be detected and the absolute temperature measured at any suitable time scale. For example, signal intensity is measured and averaged over a selected time window (e.g., one minute).

In the third stage 103, a temperature change measurement is performed (e.g., by the ϕ-OTDR assembly 54) by interrogating the optical fiber with a coherent pulsed signal configured to cause Rayleigh backscatter. In one embodiment, the laser has a narrow linewidth (e.g., narrower than the linewidth of the DTS laser) and has a central wavelength that is greater than the DTS laser's wavelength (e.g., greater than 1560 nm). Signals reflected from sensing locations in the optical are received by a reflectometer unit for each interrogation signal and/or pulse. The reflected signals are sampled to generate temperature change data. Temperature changes may be calculated in real time or otherwise at time scales smaller than the DTS time scales.

Temperature change may be estimated based on variation of the phase of backscattered light between two locations in the optical fiber. If there is no temperature change, the phase of the backscattered light should be the same. The phase difference variation may be converted to an intensity change using an interferometer such as the Mach-Zehnder interferometer such as shown in FIG. 4.

The output intensity S1, S2 and S3 of the three arms (e.g., those attached to the 3×3 coupler 92) of the interferometer can be expressed as:

$$S1 = A*\cos(\phi+0)$$

$$S2 = A*\cos(\phi+\pi/3)$$

$$S3 = A*\cos(\phi+2\pi/3)$$

where A is a constant. The outputs of the interferometer can be combined to estimate the phase difference and thereby estimate changes in temperature on the order of, e.g., 0.01 degrees C. In addition, the direction of the phase change is also determined to indicate whether the temperature change is an increase or a decrease. For example, the temperature change is correlated with the amount of change in phase, where a negative phase difference may indicate a decrease in temperature and a positive phase difference may indicate an increase in temperature.

In one embodiment, the time scale of the temperature change measurement is significantly smaller than the time scale needed for estimating the absolute temperature. For example, the absolute temperature can be taken at intervals of about one minute (or multiple absolute temperature measurements are taken during each interval and averaged). Phase changes and associated temperature changes can be determined by sampling backscatter using the ϕ-OTDR assembly at high rates (e.g., kHz level sampling rates)

In the fourth stage 104, the ϕ-OTDR temperature data is correlated or otherwise combined with the DTS temperature data to provide absolute temperature measurements and the change of the absolute temperature over time.

For example, a real time temperature distribution along the optical fiber (or at one or more selected intervals) can be generated using absolute temperature change data generated using a relatively large time scale (e.g., a temperature value generated approximately every one second to one minute), and using temperature change data generated using a relatively small time scale (e.g., approximately every millisecond or having a 1 kHz update rate). In this way, a high resolution, real time temperature profile can be generated.

In the fifth stage 105, various actions can be performed based on the temperature information. Such actions include, for example, displaying information (e.g., as a temperature profile or temperature log) to a device or user, determining downhole conditions, and adjusting operational parameters of the downhole operation. Other actions include, for example, adjustment of operational parameters such as drilling parameters (e.g., weight on bit, rate of penetration, fluid pumping rate) and stimulation or production parameters (injection flow rate, production flow rate, etc.) adjusted based on temperature information. The adjustment may be performed by a processor or controller (e.g., the interrogation unit 30) receiving temperature data), a human operator or both.

The systems and methods described herein provide various advantages over prior art techniques. The systems and methods provide a mechanism to measure temperature changes (and other parameter changes) at high resolution, e.g., corresponding to temperature changes on the order of 0.01 C or smaller, with high update rates. The system and methods also provide the capability to provide a calibrated temperature profile including absolute temperature and temperature changes at higher resolution than has been possible with conventional DTS systems.

Set forth below are some embodiments of the foregoing disclosure:

Embodiment 1

A method of measuring temperatures, comprising: disposing a carrier in a borehole in an earth formation, the carrier having an optical fiber connected thereto; interrogating the optical fiber with a pulsed optical signal generated by a distributed temperature sensing (DTS) assembly, the pulsed optical signal having a first frequency, and receiving first reflected signals from the optical fiber; estimating an absolute temperature from the reflected signals; interrogating the optical fiber with an at least partially coherent optical signal from a phase sensitive optical time domain reflectometry (ϕ-OTDR) assembly, the at least partially coherent optical signal having a second frequency, and receiving second reflected signals from multiple scattering locations in the optical fiber; estimating a phase difference between the reflected signals, and estimating a temperature change based on the phase difference; and combining the absolute temperature and the temperature change to generate a temperature profile at a location in the borehole.

Embodiment 2

The method of any prior embodiment, wherein the carrier is configured to perform aspects of an energy industry operation, the method further comprising adjusting an operational parameter of the energy industry operation based on the temperature profile.

Embodiment 3

The method of any prior embodiment, wherein the DTS assembly is configured to measure Raman backscatter and the ϕ-OTDR assembly is configured to measure Rayleigh backscatter.

Embodiment 4

The method of any prior embodiment, wherein the second frequency is selected to cause the second reflected signals to include signals having an anti-Stokes wavelength.

Embodiment 5

The method of any prior embodiment, wherein the pulsed optical signal has a wavelength that is greater than the anti-Stokes wavelength.

Embodiment 6

The method of any prior embodiment, wherein estimating the absolute temperature is performed for each of a first plurality of successive time windows, and estimating the temperature change is performed for each of a second plurality of successive time windows, each of the first plurality of successive time windows being different than each of the second plurality of successive time windows.

Embodiment 7

The method of any prior embodiment, wherein each of the first plurality of successive time windows is longer than each of the second plurality of successive time windows.

Embodiment 8

The method of any prior embodiment, wherein estimating the absolute temperature includes generating an average absolute temperature value for each of the first plurality of successive time windows, and estimating the temperature change is performed in real time in response to receiving the second reflected signals

Embodiment 9

The method of any prior embodiment, wherein receiving the first reflected signals from the optical fiber and receiving the second reflected signals is performed simultaneously, the first plurality of successive time windows and the second plurality of successive time windows occurring over the same time period.

Embodiment 10

The method of any prior embodiment, wherein estimating the phase difference includes estimating a direction of the phase difference, wherein a first direction is associated with an increase in temperature, and a second direction opposite to the first direction is associated with a decrease in temperature.

Embodiment 11

A system for measuring temperatures, comprising: an optical fiber having a length connected to a carrier configured to be disposed in a borehole in an earth formation; a distributed temperature sensing (DTS) assembly configured to interrogate the optical fiber with a pulsed optical signal and receive first reflected signals from the optical fiber, the pulsed optical signal having a first frequency; a phase sensitive optical time domain reflectometry ($\phi$-OTDR) assembly configured to interrogate the optical fiber with an at least partially coherent optical signal and receive second reflected signals from multiple scattering locations in the optical fiber, the at least partially coherent optical signal having a second frequency; and a processor configured to perform: estimating an absolute temperature from the reflected signals; estimating a phase difference between the reflected signals, and estimating a temperature change based on the phase difference; and combining the absolute temperature and the temperature change to generate a temperature profile at a location in the borehole.

Embodiment 12

The system of any prior embodiment, wherein the carrier is configured to perform aspects of an energy industry operation, and the processor is configured to adjust an operational parameter of the energy industry operation based on the temperature profile.

Embodiment 13

The system of any prior embodiment, wherein the DTS assembly is configured to measure Raman backscatter and the $\phi$-OTDR assembly is configured to measure Rayleigh backscatter.

Embodiment 14

The system of any prior embodiment, wherein the second frequency is selected to cause the second reflected signals to include signals having an anti-Stokes wavelength.

Embodiment 15

The system of any prior embodiment, wherein the pulsed optical signal has a wavelength that is greater than the anti-Stokes wavelength.

Embodiment 16

The system of any prior embodiment, wherein estimating the absolute temperature is performed for each of a first plurality of successive time windows, and estimating the temperature change is performed for each of a second plurality of successive time windows, each of the first plurality of successive time windows being different than each of the second plurality of successive time windows.

Embodiment 17

The system of any prior embodiment, wherein each of the first plurality of successive time windows is longer than each of the second plurality of successive time windows.

Embodiment 18

The system of any prior embodiment, wherein estimating the absolute temperature includes generating an average absolute temperature value for each of the first plurality of successive time windows, and estimating the temperature change is performed in real time in response to receiving the second reflected signals.

Embodiment 19

The system of any prior embodiment, wherein estimating the phase difference includes estimating a direction of the phase difference.

Embodiment 20

The system of any prior embodiment, wherein a first direction is associated with an increase in temperature, and a second direction opposite to the first direction is associated with a decrease in temperature.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of measuring temperatures, comprising:
   disposing a carrier in a borehole in an earth formation, the carrier having an optical fiber connected thereto;
   interrogating the optical fiber with a pulsed optical signal generated by a distributed temperature sensing (DTS) assembly, the pulsed optical signal having a first frequency, and receiving first reflected signals from the optical fiber;
   estimating an absolute temperature from the reflected signals;
   interrogating the optical fiber with an at least partially coherent optical signal from a phase sensitive optical time domain reflectometry ($\phi$-OTDR) assembly, the at least partially coherent optical signal having a second frequency, and receiving second reflected signals from multiple scattering locations in the optical fiber;
   estimating a phase difference between the reflected signals, and estimating a temperature change based on the phase difference; and
   combining the absolute temperature and the temperature change to generate a temperature profile at a location in the borehole.

2. The method claim 1, wherein the carrier is configured to perform aspects of an energy industry operation, the method further comprising adjusting an operational parameter of the energy industry operation based on the temperature profile.

3. The method of claim 1, wherein the DTS assembly is configured to measure Raman backscatter and the $\phi$-OTDR assembly is configured to measure Rayleigh backscatter.

4. The method of claim 1, wherein the second frequency is selected to cause the second reflected signals to include signals having an anti-Stokes wavelength.

5. The method of claim 4, wherein the pulsed optical signal has a wavelength that is greater than the anti-Stokes wavelength.

6. The method of claim 1, wherein estimating the absolute temperature is performed for each of a first plurality of successive time windows, and estimating the temperature change is performed for each of a second plurality of successive time windows, each of the first plurality of successive time windows being different than each of the second plurality of successive time windows.

7. The method of claim 6, wherein each of the first plurality of successive time windows is longer than each of the second plurality of successive time windows.

8. The method of claim 7, wherein estimating the absolute temperature includes generating an average absolute temperature value for each of the first plurality of successive time windows, and estimating the temperature change is performed in real time in response to receiving the second reflected signals.

9. The method of claim 6, wherein receiving the first reflected signals from the optical fiber and receiving the second reflected signals is performed simultaneously, the first plurality of successive time windows and the second plurality of successive time windows occurring over the same time period.

10. The method of claim 1, wherein estimating the phase difference includes estimating a direction of the phase difference, wherein a first direction is associated with an increase in temperature, and a second direction opposite to the first direction is associated with a decrease in temperature.

11. A system for measuring temperatures, comprising:
   an optical fiber having a length connected to a carrier configured to be disposed in a borehole in an earth formation;
   a distributed temperature sensing (DTS) assembly configured to interrogate the optical fiber with a pulsed optical signal and receive first reflected signals from the optical fiber, the pulsed optical signal having a first frequency;
   a phase sensitive optical time domain reflectometry ($\phi$-OTDR) assembly configured to interrogate the optical fiber with an at least partially coherent optical signal and receive second reflected signals from multiple scattering locations in the optical fiber, the at least partially coherent optical signal having a second frequency; and
   a processor configured to perform:
   estimating an absolute temperature from the reflected signals;
   estimating a phase difference between the reflected signals, and estimating a temperature change based on the phase difference; and
   combining the absolute temperature and the temperature change to generate a temperature profile at a location in the borehole.

12. The system claim 11, wherein the carrier is configured to perform aspects of an energy industry operation, and the processor is configured to adjust an operational parameter of the energy industry operation based on the temperature profile.

13. The system of claim 11, wherein the DTS assembly is configured to measure Raman backscatter and the $\phi$-OTDR assembly is configured to measure Rayleigh backscatter.

14. The system of claim 11, wherein the second frequency is selected to cause the second reflected signals to include signals having an anti-Stokes wavelength.

15. The system of claim 14, wherein the pulsed optical signal has a wavelength that is greater than the anti-Stokes wavelength.

16. The system of claim 11, wherein estimating the absolute temperature is performed for each of a first plurality of successive time windows, and estimating the temperature change is performed for each of a second plurality of successive time windows, each of the first plurality of successive time windows being different than each of the second plurality of successive time windows.

17. The system of claim 16, wherein each of the first plurality of successive time windows is longer than each of the second plurality of successive time windows.

18. The system of claim 17, wherein estimating the absolute temperature includes generating an average absolute temperature value for each of the first plurality of successive time windows, and estimating the temperature change is performed in real time in response to receiving the second reflected signals.

19. The system of claim 11, wherein estimating the phase difference includes estimating a direction of the phase difference.

20. The system of claim 19, wherein a first direction is associated with an increase in temperature, and a second direction opposite to the first direction is associated with a decrease in temperature.

* * * * *